(12) United States Patent
Nelson

(10) Patent No.: US 9,533,831 B2
(45) Date of Patent: Jan. 3, 2017

(54) CONVEYOR BELT MONITOR

(71) Applicant: David W. Nelson, Coal City, WV (US)

(72) Inventor: David W. Nelson, Coal City, WV (US)

( * ) Notice: Subject to any disclaimer, the term of this patent is extended or adjusted under 35 U.S.C. 154(b) by 0 days.

(21) Appl. No.: 15/073,581

(22) Filed: Mar. 17, 2016

(65) Prior Publication Data

US 2016/0289009 A1    Oct. 6, 2016

Related U.S. Application Data

(60) Provisional application No. 62/140,412, filed on Mar. 30, 2015.

(51) Int. Cl.
*B65G 43/00*  (2006.01)
*B65G 43/02*  (2006.01)

(52) U.S. Cl.
CPC ..... *B65G 43/02* (2013.01); *B65G 2812/02108* (2013.01)

(58) Field of Classification Search
CPC ................................ B65G 43/00; B65G 43/02
USPC .... 198/810.01, 810.02, 860.4, 502.4, 810.04
See application file for complete search history.

(56) References Cited

U.S. PATENT DOCUMENTS

| | | | |
|---|---|---|---|
| 4,087,800 A | 5/1978 | Lee | |
| 4,088,222 A * | 5/1978 | Hurt | H01H 35/06 198/502.4 |
| 4,258,840 A * | 3/1981 | Conkle | B65G 43/04 198/502.4 |
| 4,462,523 A | 7/1984 | Kerr | |
| 4,564,099 A * | 1/1986 | Uozumi | B66B 29/005 198/323 |
| 6,131,727 A | 10/2000 | Nelson | |
| 7,140,486 B2 * | 11/2006 | Kim | F16H 7/08 198/502.4 |
| 7,958,992 B1 * | 6/2011 | Stier | E04F 19/08 193/34 |
| 2011/0024269 A1 | 2/2011 | Wallace et al. | |
| 2012/0217132 A1 | 8/2012 | Twigger et al. | |

FOREIGN PATENT DOCUMENTS

WO    WO 97/05047    2/1997

* cited by examiner

*Primary Examiner* — James R Bidwell
(74) *Attorney, Agent, or Firm* — Richard C. Litman

(57) ABSTRACT

The conveyor belt monitor includes sensors and motion detectors for monitoring the condition of the conveyor belt of a conveyor belt system. The monitor includes upper and lower sensors respectively positioned above and below the lower belt of the conveyor to transmit warning of belt damage or other problem(s) while allowing the conveyor to continue operation. An additional switch above the upper sensor detects extreme belt damage, and shuts down the conveyor if such damage or condition(s) is/are detected. A motion sensor may also be provided to detect rotation of the upper roller and to transmit a warning of material carried on the lower or return belt surface that causes the roller to rotate. The monitor thus automatically warns of an anomalous condition while allowing the conveyor to continue to operate, or shuts down the conveyor in the event of an extreme condition(s).

13 Claims, 5 Drawing Sheets

CONVEYOR BELT MONITOR

CROSS-REFERENCE TO RELATED APPLICATION

This application claims the benefit of U.S. Provisional Patent Application Ser. No. 62/140,412, filed Mar. 30, 2015.

BACKGROUND OF THE INVENTION

1. Field of the Invention

The present invention relates generally to conveyor systems and the like, and particularly to a conveyor belt monitor incorporating several sensors monitoring the condition of the belt and the load on the belt to provide the operator with sufficient time to correct the problem prior to belt breakage or other damage.

2. Description of the Related Art

Conveyor belt systems are used for relatively local transport of a wide variety of goods and materials, and operations are generally highly dependent upon the reliable and continuous operation of such conveyor belt systems. Many such conveyor systems have extensive lengths. Some conveyor systems used in the coal mining industry have lengths on the order of a mile from the face of the coal seam to a point where the loose coal can be loaded into a mine vehicle for further transport. When such a conveyor belt system breaks down for whatever reason, e.g., a broken belt or belt splice, spillage of loose coal onto the lower or return belt and corresponding accumulation of coal at the tail roller at the coal seam face (known in the mining industry as a "gob-out"), delivery of coal from the face of the seam comes to a complete halt, and often many hours are lost due to the time required to repair or perhaps replace the belt.

In many cases a relatively minor problem may occur that requires monitoring of the condition, with the system still being functional so long as the problem does not worsen. For example, a "gob-out" may be remedied by clearing the accumulated coal from the lower belt at the tail roller, or a slight delamination can be monitored to allow the system to continue in operation so long as the delamination does not worsen. In such cases it is far more efficient to continue operation of the conveyor belt system, rather than shutting down the entire system unnecessarily.

Thus a conveyor belt monitor solving the aforementioned problems is desired.

SUMMARY OF THE INVENTION

The conveyor belt monitor includes various sensors for detecting the condition of the belt and/or material(s) improperly carried on the belt. The monitor includes a housing that installs upon the conventional lateral members of a conveyor frame. Upper and lower rollers extend across the housing and capture the lower or return portion of the conveyor belt therebetween. Upper and lower sensor switches are installed respectively at the axles of the upper and lower rollers. These switches provide a warning signal to the operator in the event of an anomalous condition such as a minor belt tear or minor damage at a belt splice or material being carried improperly on the lower or return belt, etc. A third sensor switch is installed somewhat higher above the upper roller and serves to detect more extreme damage to the conveyor belt, and automatically shuts down the conveyor system if such extreme damage is detected. The upper and lower sensor switches and the third sensor can comprise mechanical switches or magnetically actuated switches.

A fourth switch comprises a motion detector set to detect rotation of the upper roller. Neither roller is normally in contact with the belt; thus neither roller will normally rotate. Rotation of the upper roller is indicative of material being carried atop the lower or return portion of the belt, which is indicative of a twisted or otherwise damaged belt that allows the spillage of material onto the return portion of the belt. This motion detector transmits an alarm or warning even though the belt may not have shifted sufficiently to move the rollers in order to activate either of the first two sensor switches. The system can incorporate a programmable logic controller (PLC) that senses the duration of any alarm signal from the various warning sensor switches. The PLC will allow the conveyor to continue to operate in the event of receipt of a short or intermittent alarm or warning signal. However, in the event of receipt of a longer duration signal, the PLC will shut down the conveyor to prevent further damage and/or loss of material being carried on the conveyor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The conveyor belt monitor essentially comprises a frame with upper and lower rollers extending thereacross, respectively beneath the conventional upper and lower portions of an endless conveyor belt. A series of sensors monitor the rollers to actuate an alarm and/or shut down the conveyor system in the event that either of the rollers is displaced, which displacement would indicate some adverse condition in the conveyor system.

Figure 1:
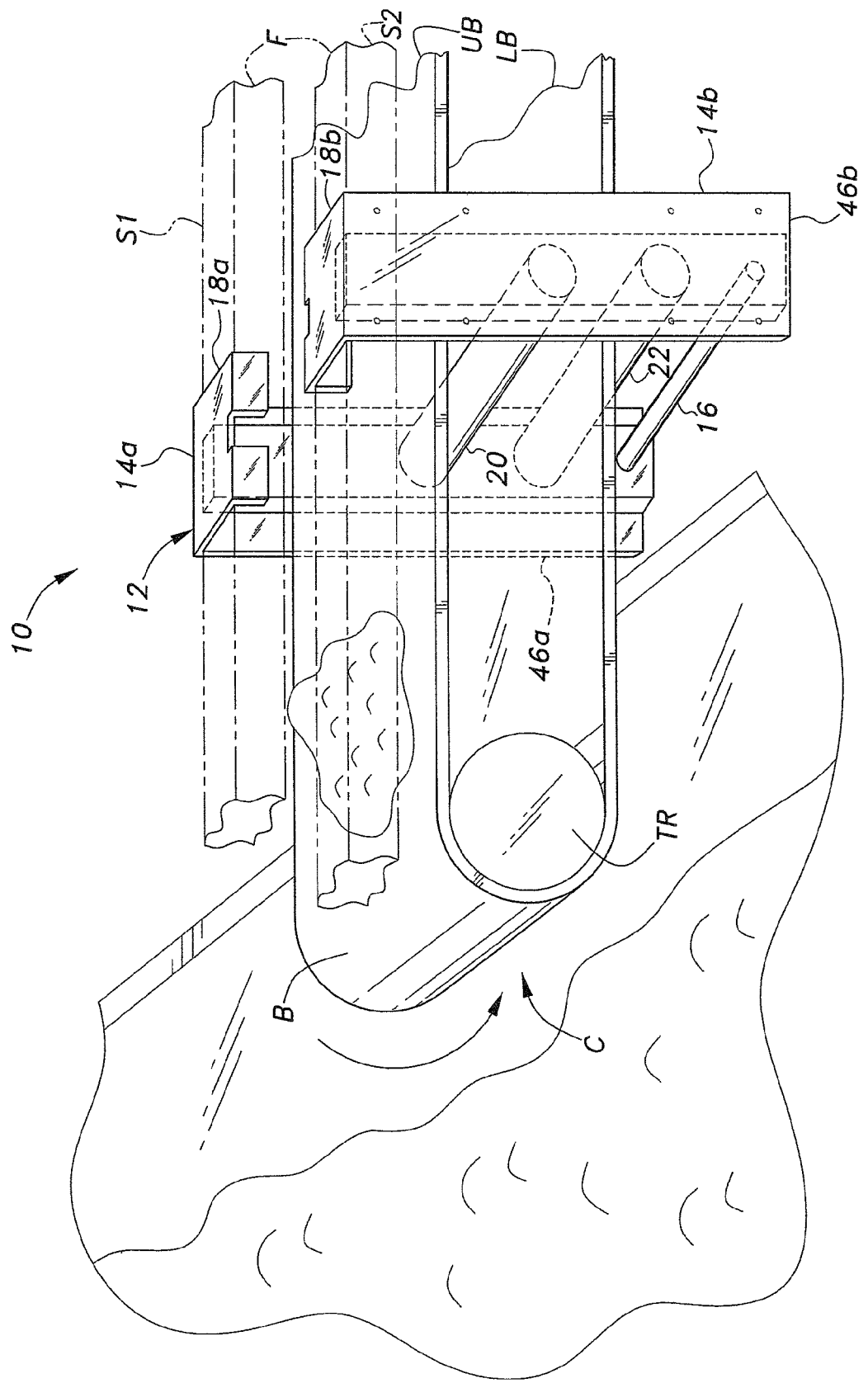
FIG. 1 is an environmental, perspective view of a conveyor system and conveyor belt monitor according to the present invention, illustrating its basic structure and features.

FIG. 1 of the drawings provides an environmental perspective view of a portion of a conventional conveyor system C, with its endless belt B comprising an upper belt portion UB and lower belt portion LB and extending around the tail roller TR and an opposite distal head roller (not shown). The belt B with its upper and lower portions UB and LB and tail roller TR are supported by the laterally opposed first and second sides S1 and S2 of a conveyor frame F. (The conveyor frame F is not shown in other Figs., for clarity in the drawing Figs.) This structure is conventional and known in the art. Such conveyor systems C are used in a wide variety of industries, e.g., the coal mining industry to transport loose coal from the face of the coal seam to other transport means to remove the coal from the mine The conveyor belt monitor 10 essentially comprises a housing 12 having mutually laterally opposed first and second sides, respectively 14a and 14b, connected by a crossmember 16. The housing 12, and more specifically the upper ends of the two sides 14a and 14b, includes respective first and second hangers 18a, 18b that extend from the upper ends of the sides 14a, 14b to rest atop the respective sides S1 and S2 of the conveyor frame S when the conveyor belt monitor 10 is installed thereon. An upper roller 20 extends between the first and second sides 14a, 14b of the housing 12, and is positioned above the lower belt portion LB when the monitor 10 is installed on the conveyor system C. Similarly, a lower roller 22 extends between the first and second sides 14a, 14b of the housing 12 and is positioned below the lower belt portion LB when the monitor 10 is installed on the conveyor system C, i.e., the lower belt LB passes between the upper and lower rollers 20 and 22. The two rollers 20 and 22 are positioned sufficiently far apart that they do not contact the lower belt LB during normal operation. They are not a part of the conveyor system C and do not provide support for the lower belt LB, or any other portion of the belt B, during normal operation of the conveyor system.

Figure 2:
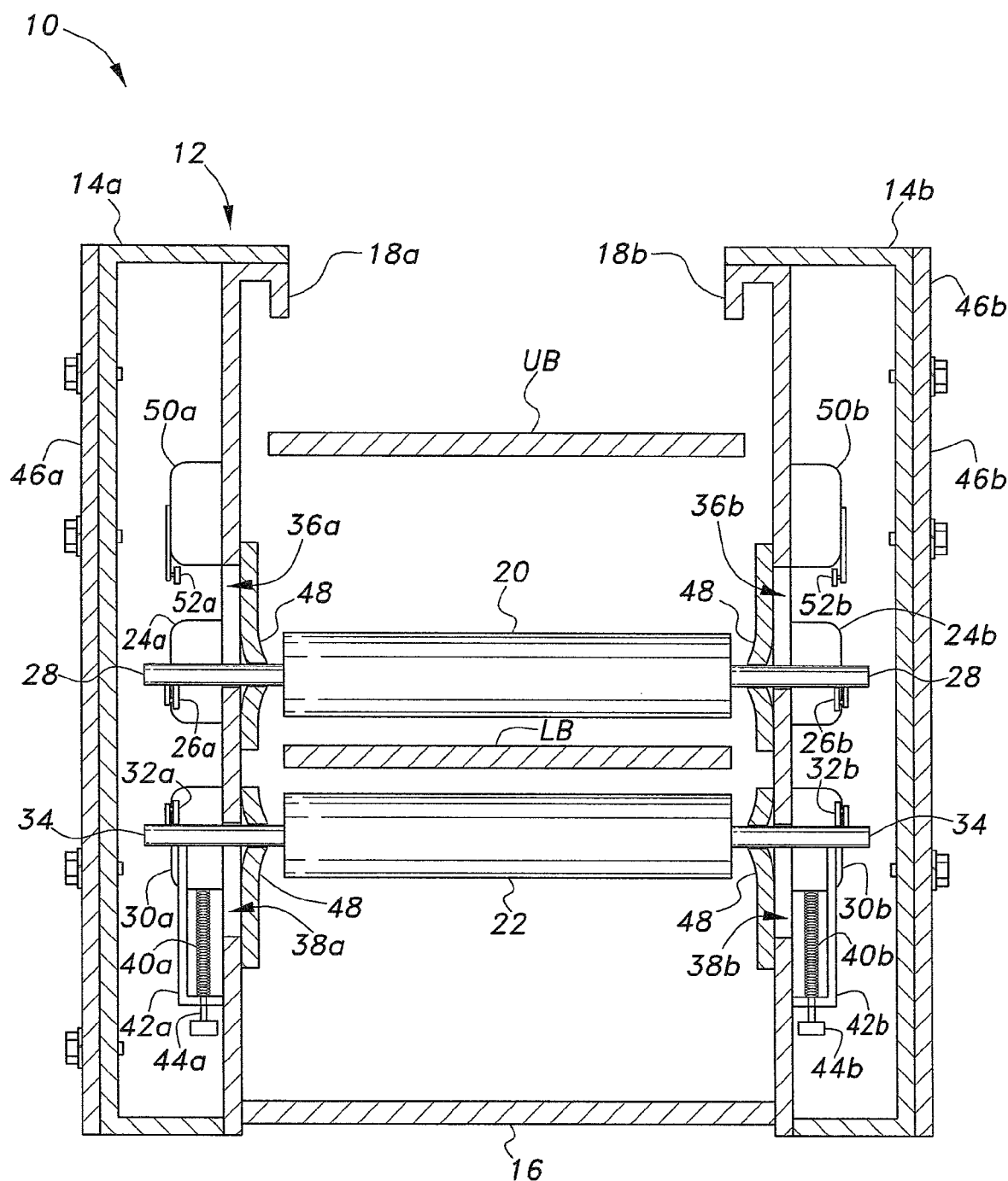
FIG. 2 is an environmental end elevation view in section of the conveyor system and conveyor belt monitor according to the present invention, illustrating further details thereof.
Figure 3:
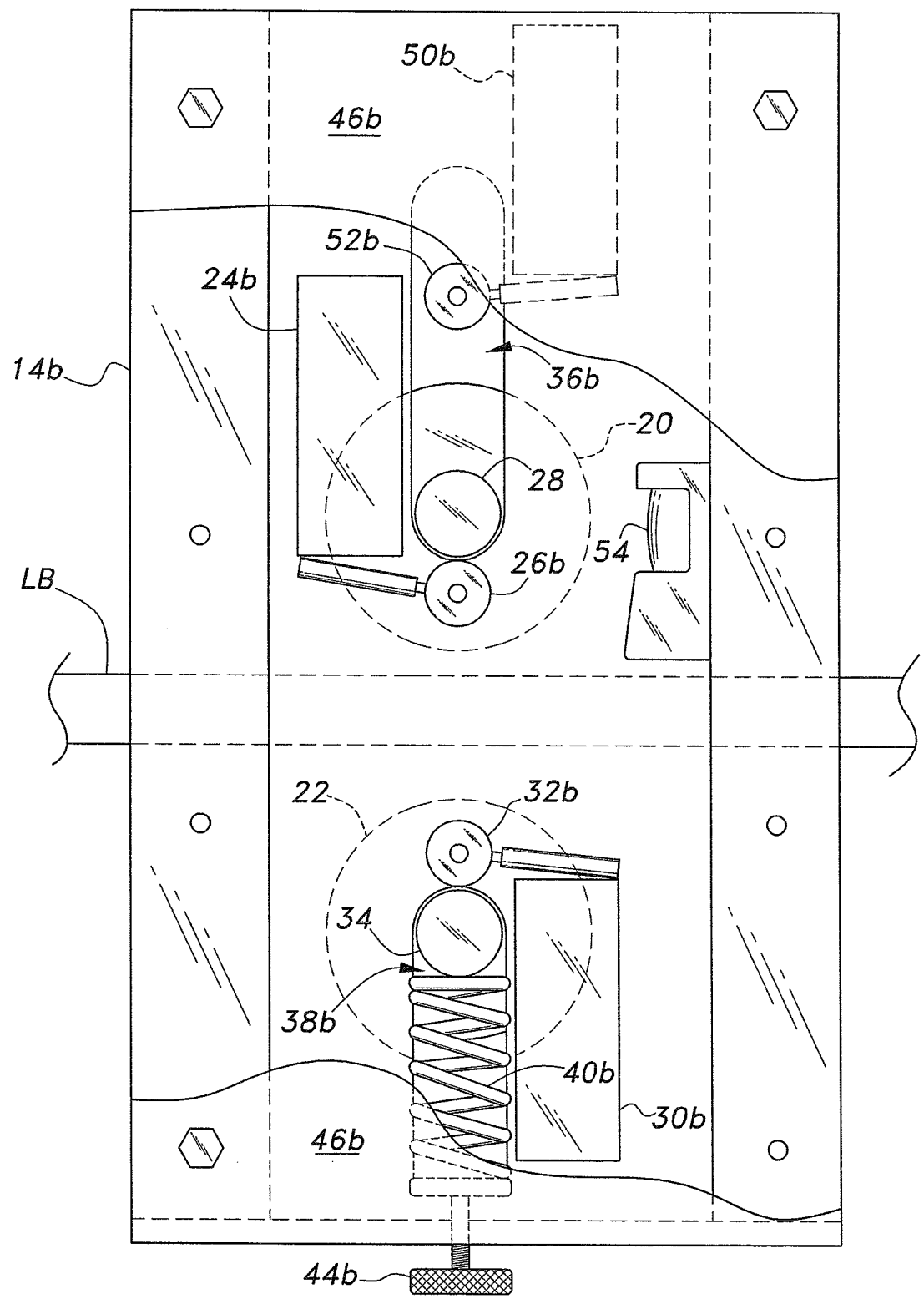
FIG. 3 is a detailed schematic side elevation view of one sensor switch array of the conveyor belt monitor according to the present invention, illustrating various details thereof.

FIGS. 2 and 3 illustrate the various sensors incorporated with the present conveyor monitor 10. A pair of upper warning sensors 24a and 24b is installed respectively with the first and second sides 14a and 14b of the housing 12. The contact elements (e.g., wheels or rollers, etc.) 26a, 26b of these sensors or switches are in contact with the underside of the axle 28 of the upper roller 20 and communicate with the upper roller. Similarly, a pair of lower warning sensors 30a and 30b is installed respectively with the first and second sides 14a and 14b of the housing 12. The contact elements (e.g., wheels or rollers, etc.) 32a, 32b of these sensors or switches are in contact with the upper side of the axle 34 of the lower roller 22 and communicate with the lower roller.

The upper roller axle 28 is disposed within first and second upper guide slots 36a, 36b formed respectively in the two housing sides 14a, 14b, and normally rests at the bottoms of these slots but is free to slide up and down within these slots. Thus, debris or other matter remaining on the upper surface of the lower belt LB (known as a "gob-out" in the coal mining industry), or perhaps a bad belt splice or delamination or other belt damage, will lift the upper roller 20 and its axle 28 upward within its guide slots 36a, 36b, thereby displacing the upper sensor contacts 26a, 26b and actuating the respective upper sensors 24a, 24b.

Similarly, the lower roller axle 34 is disposed within first and second lower guide slots 38a, 38b formed respectively in the two housing sides 14a, 14b, and is free to slide up and down within these slots. However, it will be seen that due to gravity, the lower roller axle 34 would tend to drop away from the lower sensor switch contacts 32a, 32b to the bottom of its slots 38a, 38b, if it were not supported in some manner. Accordingly, the lower roller axle 34 is resiliently supported within its two lower guide slots 38a, 38b by respective springs 40a and 40b. The springs 40a, 40b are in turn supported in brackets 42a, 42b (FIG. 2) and may be adjusted by means of threaded adjusters 44a and 44b that thread into the bottoms of the brackets 42a, 42b and bear against the bottom ends of the springs 40a, 40b. The springs 40a, 40b are preferably adjusted to hold the lower roller axle 34 just within the upper ends of the lower slots 38a, 38b, without exerting any noticeable or significant pressure against the upper ends of the two slots 38a, 38b. Thus, debris or other matter remaining on the lower or outer surface of the lower belt LB, or perhaps a bad belt splice or delamination or other belt damage, will push the lower roller 22 and its axle 34 downward within its lower guide slots 38a, 38b, thereby displacing the lower sensor contacts 32a, 32b and actuating the respective lower sensors 30a, 30b.

It will be noted that the above configuration duplicates the upper and lower sensors and their contacts in each of the housing sides 14a and 14b. It is possible to save some complexity and expense by providing only one set of sensors and their contacts in one of the housing sides. Preferably, however, two laterally opposed upper and lower sensors and associated components are provided to provide for detection of any laterally offset anomaly in or on the lower belt portion LB. If only one set of sensors were provided, e.g., on the first housing side 14a, it is possible that some anomaly of the opposite side of the lower belt LB might fail to displace the first housing side sensor(s) sufficiently to trigger an alarm. However, a single set of sensors installed on one of the housing sides might be acceptable in some circumstances, e.g., a relatively narrow belt with some additional lateral span between the belt edges and the sensor contacts.

The upper and lower warning sensors 24a, 24b, 30a, and 30b can utilize any of various known operating principles, e.g., electromechanical, magnetic proximity, hydraulic or pneumatic, etc., as desired. In any event, it is preferred that some protection from contamination and/or physical damage be provided to these switches. Accordingly, the two housing sides 14a, 14b are provided with cover plates, respectively 46a and 46b. The cover plates 46a, 46b can be bolted to the underlying housing sides 14a, 14b, as shown in the drawings, or otherwise attached, e.g., hinge and latch, etc. The second side cover plate 46b is shown partially broken away in FIG. 3, to more clearly show the various elements below. Debris protection is also provided by resilient seals 48 disposed along each side of each of the slots 36a, 36b, 38a, and 38b. The seals 48 deflect around the upper and lower axles 28 and 34, and fold closed beyond the axles.

Figure 4:
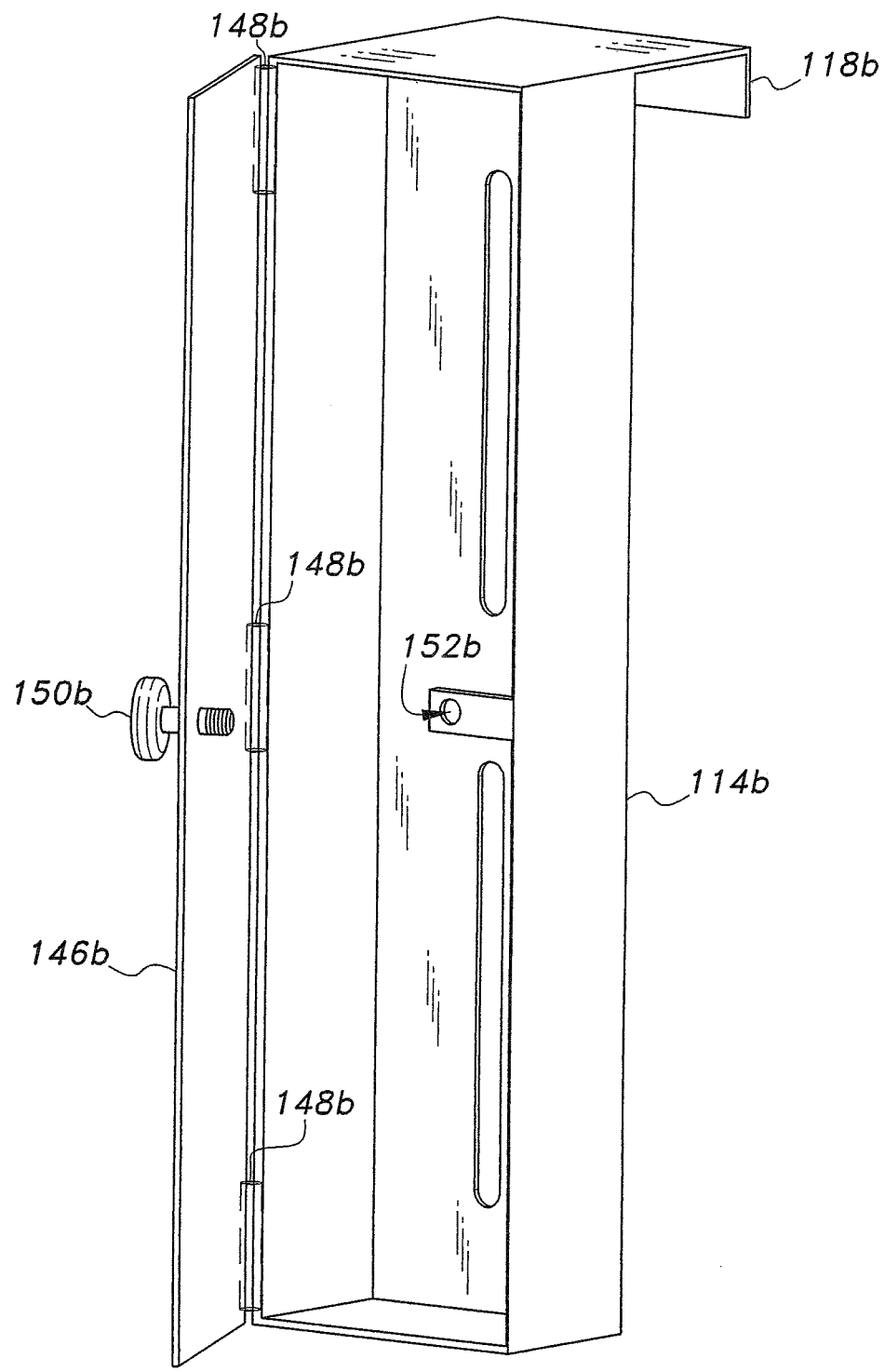
FIG. 4 is a perspective view of one side and door of an alternative housing of the conveyor belt monitor according to the present invention.

FIG. 4 of the drawings is a perspective view of an alternative housing side 114b and access door 146b. The door 146b is attached to the housing side 114b by hinges 148b along one edge thereof A latch 150b is provided on or in the door 146b, selectively engaging a cooperating latch receptacle 152b in the housing side 114b. A seal(s), not shown, can be provided at the juncture of the door 146b with the housing side 114b. The assembly is supported on the second side S2 of the conveyor frame (FIG. 1) by its hanger 118b. It will be noted that the opposite side of the assembly can include a similar arrangement in mirror image to that shown in FIG. 4.

The above-described upper and lower warning sensors 24a, 24b, 30a, and 30b are positioned to provide immediate warning or notification of even a slight displacement of either of the roller axles 28 or 34 due to corresponding displacement of their rollers 20 or 22. While these warning sensors may be connected to the conventional conveyor drive to cause the drive to shut down in the event of actuation of these sensors, it is preferred that these four sensors only provide an announcement, warning, or alarm of some anomalous condition of the conveyor belt B. The relatively slight displacement required to trigger such an announcement or alarm might be due to a relatively minor problem that would allow the conveyor system C to continue to operate for some period of time, or some condition that may be cleared while the system is in operation.

However, it is possible that a more serious problem might occur that would result in serious damage and lost time if it were allowed to continue. In such a case, it would be better to shut down the conveyor system C immediately, rather than allowing it to continue in operation. Generally, such serious problems will manifest themselves by relatively large displacements of the conveyor belt B, and particularly the lower belt portion LB. Accordingly, a pair of conveyor shutdown switches 50*a* and 50*b* is provided in the two housing sides 14*a*, 14*b*, installed at some vertical distance above the upper roller axle 28. A relatively large upward displacement of the lower belt portion LB will result in the upper roller 20 and its axle 28 being lifted in the upper guide slots 36*a*, 36*b* to the point that the axle 28 displaces the two contacts 52*a*, 52*b* of the shutdown switches 50*a* and 50*b*, thereby actuating these two switches. These two shutdown switches 50*a*, 50*b* are preferably connected to the conventional conveyor drive to shut down the conveyor drive immediately. They are also preferably connected to an annunciator or alarm system, to alert the operator of the system of such an extreme displacement of the upper roller 20. As in the cases of the upper and lower warning sensors 24*a*, 24*b*, 30*a*, and 30*b*, a single such shutdown switch may be provided in limited conveyor configurations, although two such switches 50*a*, 50*b* installed respectively in the two laterally opposed sides 14*a*, 14*b* of the housing 12 are preferred. The shutdown switches 50*a*, 50*b* may be of the same type or principle of operation as described further above for the warning sensors, i.e., electromechanical, hydraulic, pneumatic, magnetic proximity, etc.

An additional motion sensor warning switch 54 is also preferably installed in the housing 12, as shown in the end elevation view of FIG. 2. This switch 54 preferably comprises an electromagnetic switch, i.e., infrared, photoelectric, etc., and is situated adjacent the upper roller 20 to detect rotary motion of the upper roller axle 28. Thus, even in the event that the upper roller is not displaced vertically, or not displaced sufficiently to actuate one or both of the upper warning sensors 24*a*, 24*b*, any contact of material residing upon the upper or inner surface of the lower belt portion LB with the upper roller 20 that is sufficient to cause the roller 20 and its axle 28 to rotate, will result in the actuation of the motion sensor warning switch 54 to trigger an announcement, warning, or alarm. It will be seen that only a single such motion sensor warning switch 54 is needed, as rotation of the roller axle 28 will be uniform throughout the length of the axle. Thus, the single motion sensor warning switch 54 may be located anywhere that it may detect rotary motion of the axle 28, or its roller 20. This motion sensor warning switch 54 is preferably not connected to the drive of the conveyor system C. Thus, the conveyor system C will continue to operate after actuation of the motion sensor warning switch 54, but will alert the operator that some problem has occurred that may require attention or correction.

Figure 5:
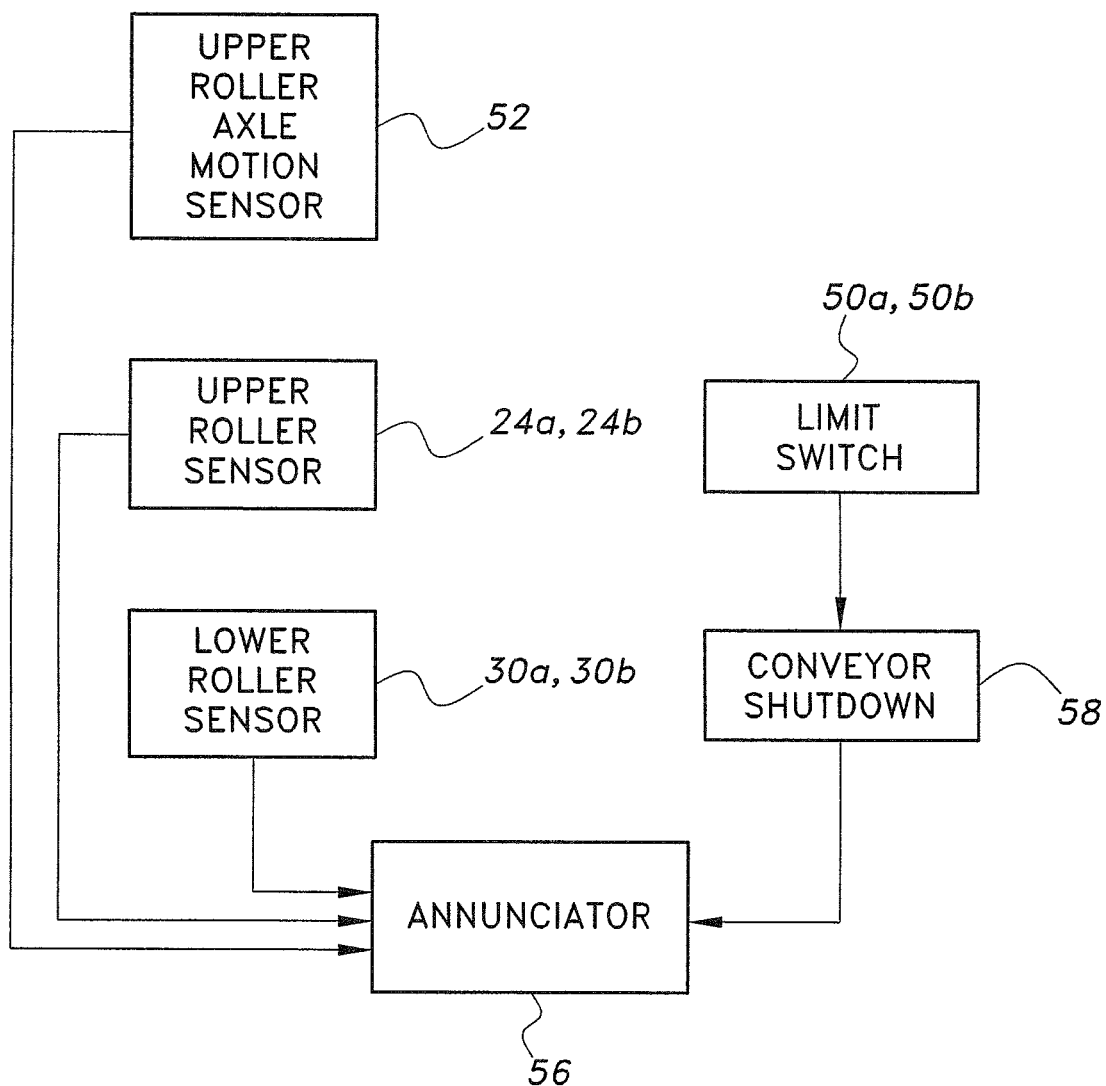
FIG. 5 is a block diagram of the conveyor belt monitor according to the present invention, illustrating the relationship between various components of the system.

FIG. 5 is a flow chart that describes the basic steps in the operation of the conveyor belt monitor 10. It will be seen in FIG. 5 that the upper and lower roller warning sensors 24*a*, 24*b*, 30*a*, and 30*b*, as well as the upper roller axle motion sensor or warning switch 54, all communicate electronically with an annunciator system 56. The annunciator system 56 can comprise any of various annunciating means, e.g., voice alert, siren or other audial alert, visual, etc., or a combination thereof, as desired. However, the sensors 24*a*, 24*b*, 30*a*, 30*b*, and 54 are preferably not connected to any conveyor shutdown system or means. Thus, the conveyor C will continue to operate in the event that any of the sensors 24*a*, 24*b*, 30*a*, 30*b*, and 54 detect an anomaly and send a signal to the annunciator 56. However, the limit switches 50*a* and 50*b*, being positioned to detect much greater belt displacements, communicate electronically with a conveyor shutdown system or means 58. Thus, if either or both of the limit switches 50*a*, 50*b* are displaced, they will cause the conveyor system to shut down completely, as indicated by the conveyor shutdown position 58 of FIG. 5. A signal is also sent to the annunciator 56 in the event of conveyor shutdown, or alternatively directly to the annunciator 56 from the limit switches 54*a*, 54*b*, although it will be obvious to the operator that the conveyor system C has shut down in such an event. When the conveyor monitor is used in an underground mine, the system can be connected to the conventional programmable logic controller (PLC) commonly used in such mines, with the monitor reporting the belt status and/or condition to the main belt control room of the mine. Alternatively, the controls can be incorporated into a separate control box where a PLC is not used in the system.

It is to be understood that the present invention is not limited to the embodiments described above, but encompasses any and all embodiments within the scope of the following claims.

I claim:

1. A conveyor belt monitor for a conveyor belt system, the conveyor belt monitor comprising:
    a housing having mutually laterally opposed first and second sides, an upper roller disposed between the first and second sides of the housing, a lower roller spaced below the upper roller and positioned between the first and second sides of the housing;
    at least one upper warning sensor on at least one housing side, the at least one upper warning sensor communicating with the upper roller;
    at least one lower warning sensor on at least one housing side, the at least one lower warning sensor communicating with the lower roller;
    a motion sensor warning switch disposed adjacent the upper roller, the motion sensor warning switch adapted to transmit a warning in the event of rotation of the upper roller; and
    at least one conveyor shutdown switch disposed above the upper warning sensor, the conveyor shutdown switch adapted to shut down conveyor operation in the event of extreme displacement of the upper roller; whereby
    the housing is configured for positioning on sides of the frame of the conveyor belt system, the upper roller is configured for positioning above a lower belt portion of the conveyor belt system, and the lower roller is configured for positioning below a lower belt portion of the conveyor belt system.

2. The conveyor belt monitor according to claim 1, wherein at least one of the housing sides includes a door, a portion of the door detachably connected to the at least one side.

3. The conveyor belt monitor according to claim 1, further comprising first and second hangers extending respectively from the first and second sides of the housing.

4. The conveyor belt monitor according to claim 1, wherein each of the sides of the housing have upper and lower roller guide slots formed therein and a resilient seal is disposed about each of the guide slots.

5. The conveyor belt monitor according to claim 1, further comprising resilient springs supporting the lower roller.

6. The conveyor belt monitor according to claim 1, wherein:

the upper warning sensor, the lower warning sensor, and the conveyor shutdown switch are selected from the group consisting of electromechanical switches and magnetic switches; and an electromagnetic motion sensor warning switch is disposed adjacent the upper roller.

7. A conveyor belt system, comprising a frame supporting an endless belt, the belt having an upper portion and a lower portion, the frame having mutually laterally opposed first and second sides; and a conveyor belt monitor, the conveyor belt monitor including a housing having mutually laterally opposed first and second sides; an upper roller disposed between the first and second sides of the housing, above the lower portion of the belt; a lower roller disposed between the first and second sides of the housing, below the lower portion of the belt; an upper warning sensor communicating with the upper roller; a lower warning sensor communicating with the lower roller; and a motion sensor warning switch disposed adjacent the upper roller, the motion sensor warning switch adapted to transmit a warning in the event of rotation of the upper roller.

8. The conveyor belt system according to claim 7, further comprising a conveyor shutdown switch disposed above the upper warning sensor, the conveyor shutdown switch adapted to shut down conveyor operation in the event of extreme displacement of the upper roller.

9. The conveyor belt system according to claim 7, wherein at least one of the housing sides includes a door, a portion of the door detachably connected to the at least one side.

10. The conveyor belt system according to claim 7, further comprising first and second hangers extending respectively from the first and second sides of the housing.

11. The conveyor belt system according to claim 7, wherein each of the sides of the housing have upper and lower roller guide slots formed therein and a resilient seal is disposed about each of the guide slots.

12. The conveyor belt system according to claim 7, further comprising resilient springs supporting the lower roller.

13. The conveyor belt system according to claim 7, wherein:

the upper warning sensor and the lower warning sensor are selected from the group consisting of electromechanical switches and magnetic switches; and a conveyor shutdown switch is disposed above the upper warning sensor of the conveyor belt monitor, the conveyor shutdown switch being adapted to shut down conveyor operation in the event of extreme displacement of the upper roller, the conveyor shutdown switch being selected from the group consisting of electromechanical switches and magnetic switches; and the motion sensor warning switch is an electromagnetic switch.

* * * * *